May 29, 1934.   W. SIEGERT   1,960,927
STUFFING BOX FOR RECIPROCATING PUMPS AND THE LIKE
Filed Feb. 5, 1932
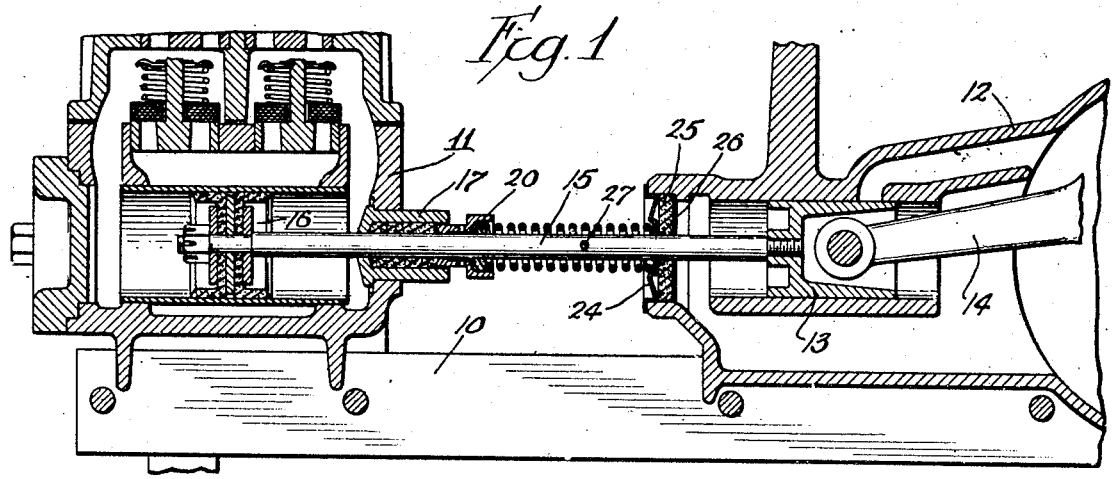
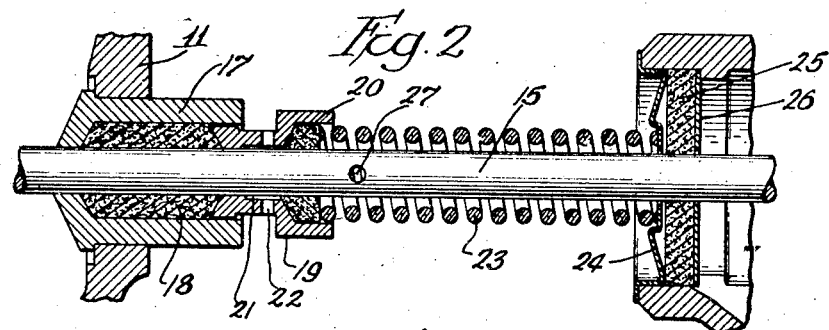
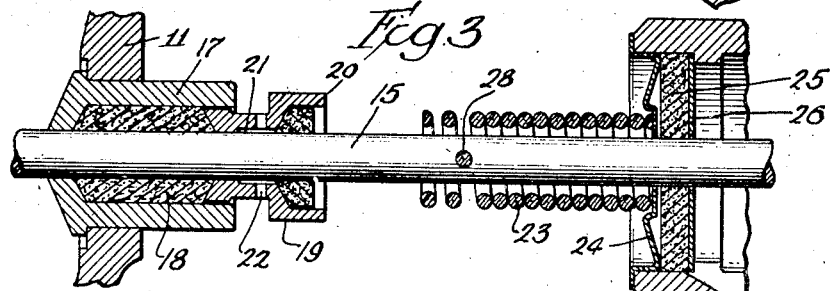
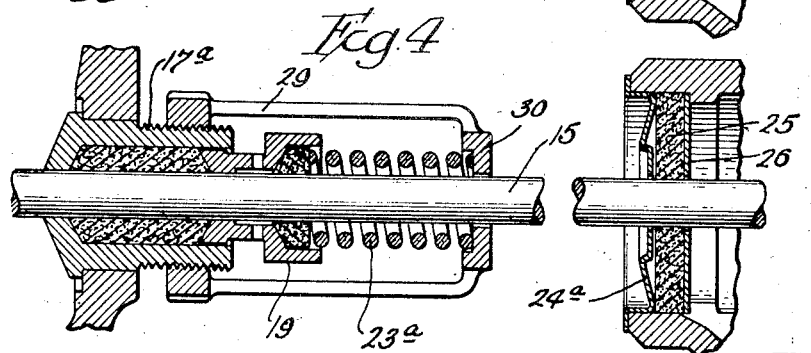
Inventor:
Walter Siegert Patented May 29, 1934

1,960,927

UNITED STATES PATENT OFFICE 1,960,927

STUFFING BOX FOR RECIPROCATING PUMPS AND THE LIKE

Walter Siegert, Dubuque, Iowa, assignor to A. Y. McDonald Mfg. Co., Dubuque, Iowa, a corporation of Iowa Application February 5, 1932, Serial No. 591,022

2 Claims. (Cl. 286—13)

It is an important object of this invention to provide an automatic take-up for the packing of stuffing boxes, particularly for use on reciprocating pumps for water and the like. With devices of this character, the water entering the stuffing box often causes the packing material to swell, thereby exerting an excessive pressure inwardly upon the piston rod of the pump and producing undue friction. It is accordingly an object of this invention to provide a stuffing box which will permit the packing material to expand under these conditions without imposing any undue load on the piston rod.

Another object is to provide a stuffing box wherein the packing material is under substantially constant pressure or compression; to provide means for preventing water from a pump cylinder or the like being carried along the piston rod, and particularly to prevent any such water from reaching the crank case of the pump where the pressure of water would be detrimental to the bearings of the pump driving mechanism.

These and other objects, as will hereinafter appear, are accomplished by this invention which is fully described in the following specification and shown in the accompanying drawing, in which—

Figure 1 is a longitudinal vertical section through a pump cylinder and part of an associated driving mechanism;

Fig. 2 is a fragmentary enlarged section showing the pump piston rod at the extreme outer end of its travel;

Fig. 3 is a similar view showing an instrument inserted through a hole in the piston and which is moved to a position for retracting the spring; and Fig. 4 illustrates a modified form of spring mounting.

The embodiment shown in Figs. 1 to 3 comprises a pump or the like having a main frame or base 10 on which is secured a pump cylinder 11 and a crank case 12. A slide 13 is slidably mounted in suitable guides in the crank case and connected in a well known manner by means of a connecting rod 14 with a driving crank (not shown). A piston rod 15 is secured at one end to the slide 13 and at the other to a piston 16 operable in the pump cylinder 11. The piston rod passes through a stuffing box 17 in the end of the pump cylinder, and this is bored to receive a suitable pump packing 18. A packing gland 19 surrounds the piston rod and bears against the packing, the inner end of the gland 19 and the bottom of the stuffing box being made conical or cup-shaped so as to force the packing toward the piston rod as pressure is applied thereto.

The packing gland is also recessed to receive a stripping washer 20 for removing from the piston rod any moisture carried along by it through the stuffing box. This gland is enlarged inside in the center at 21 and one or more holes 22 provided to allow moisture collected therein to pass out. The stripping washer is pressed inwardly against the bottom of the recess in the packing gland, which is also made conical at the bottom to press the stripping washer closely around the piston rod. Pressure is applied to the stripping washer 20 by means of a compression spring 23 which preferably surrounds the piston rod 15, the opposite end bearing upon a suitable abutment on the crank case, here shown as a retainer cap 24. Immediately behind this retainer cap lies an oil retainer washer 25 which is held between the retainer cap and a baffle plate 26. This washer, made preferably from a fibrous or pliable material, such as felt, serves to stop any moisture which possibly might pass the stripping washer 20, and also prevents oil in the crank case from being carried out on the exposed portion of the piston rod.

In order to provide for easy inspection and replacement of parts in the stuffing box, I have provided the piston rod 15 with a transverse hole 27. With the piston at the extreme left or outer end of its stroke, as shown in Fig. 2, a pin 28 is inserted between the coils of the spring 23. This pin is long enough to engage the coils at both sides so that as the piston rod is moved to the right, the spring will be compressed, as shown in Fig. 3, and held out of engagement with the stripping washer 20. While so held, the stripping washer may be drawn to the right along the piston rod for inspection and cleaning. The packing gland can also be moved to the right, thereby providing easy access to the interior of the stuffing box so that the packing 18 may be renewed.

Thus it will be seen that a very simple and efficient form of pump packing is provided, and one which will automatically allow for swelling of the packing under the action of water, if such swelling should occur. In this way the pressure is relieved and damage which might otherwise result from undue gripping of the piston rod is avoided. At the same time a simple means is provided for preventing water from traveling along the piston rod from the pump to the crank case. The bearings of the crank case are accordingly protected from the deleterious action of any such water. It will be noted further that the spring surrounds the exposed portion of the piston rod so as to protect it from mechanical injury.

In Fig. 4 is shown a modified form of the device in which the stuffing box 17ᵃ is exteriorly threaded to receive the threaded end of a yoke 29 which has an inner end passing over the pump rod and provided with an abutment 30 to receive the inner end of a spring 23ᵃ. The construction of the stuffing box and associated parts is otherwise the same. The retainer cap 24ᵃ is tightly fitted into the end of the crank case so as to be self-supporting. To get at the stuffing box in this construction the yoke 29 is unscrewed from the stuffing box and drawn away from it, thereby exposing it for inspection and repair as previously described.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. The combination with a reciprocable piston rod surrounded at one point by a gland containing compressible means to prevent travel of liquid along the rod, of a coiled spring surrounding the rod exerting a thrust at one end against the compressible means, and an abutment against which the opposite spring end may press to maintain the spring under compression, said abutment comprising a cap closely surrounding the rod, a fibrous oil retainer adjacent the cap also closely surrounding the rod, a baffle plate fitting closely against the opposite side of the oil retainer, and means supporting both the cap and plate.

2. The combination with a reciprocable piston rod surrounded at one point by a gland containing compressible means to prevent travel of liquid along the rod, of a coiled spring surrounding the rod exerting a thrust at one end against the compressible means, and an abutment against which the opposite spring end may press to maintain the spring under compression, said abutment comprising a cap closely surrounding the rod, a fibrous oil retainer adjacent the cap also closely surrounding the rod, a baffle plate fitting closely against the opposite side of the oil retainer, means supporting both the cap and plate, and means formed on the gland and abutment for centering the associated ends of the spring axially with respect to the rod.

WALTER SIEGERT.